(12) United States Patent
Otsuka et al.

(10) Patent No.: US 11,940,401 B2
(45) Date of Patent: Mar. 26, 2024

(54) SULFURIZATION DETECTION RESISTOR AND MANUFACTURING METHOD THEREFOR

(71) Applicant: KOA CORPORATION, Ina (JP)

(72) Inventors: Junichi Otsuka, Ina (JP); Yoji Kobayashi, Ina (JP)

(73) Assignee: KOA CORPORATION, Nagano (JP)

( * ) Notice: Subject to any disclaimer, the term of this patent is extended or adjusted under 35 U.S.C. 154(b) by 383 days.

(21) Appl. No.: 17/418,000

(22) PCT Filed: Dec. 24, 2019

(86) PCT No.: PCT/JP2019/050690
§ 371 (c)(1),
(2) Date: Jun. 24, 2021

(87) PCT Pub. No.: WO2020/153084
PCT Pub. Date: Jul. 30, 2020

(65) Prior Publication Data
US 2022/0091058 A1    Mar. 24, 2022

(30) Foreign Application Priority Data
Jan. 24, 2019  (JP) .................. 2019-010575

(51) Int. Cl.
*G01R 27/08*     (2006.01)
*G01N 27/04*     (2006.01)
(Continued)

(52) U.S. Cl.
CPC ........... *G01N 27/041* (2013.01); *H01C 17/22* (2013.01); *H01C 17/28* (2013.01); *H01C 7/00* (2013.01)

(58) Field of Classification Search
CPC ........ G01N 17/02; G01N 17/04; G01N 17/12; G01N 27/041; G01N 27/4045; G01N 33/0044
See application file for complete search history.

(56) References Cited

U.S. PATENT DOCUMENTS

2003/0217922 A1* 11/2003 Suganuma ......... G01N 27/4074
                                                              204/426
2016/0247610 A1*  8/2016 Shinoura ................ H01C 1/142
(Continued)

FOREIGN PATENT DOCUMENTS

CN    106249123 A    12/2016
CN    108139342 A     6/2018
(Continued)

OTHER PUBLICATIONS

Mar. 17, 2020 International Search Report issued in International Patent Application No. PCT/JP2019/050690.
(Continued)

*Primary Examiner* — Thang X Le
(74) *Attorney, Agent, or Firm* — Oliff PLC

(57) ABSTRACT

A sulfurization detection resistor makes it possible to detect a degree of sulfurization accurately and easily, and a manufacturing method for such sulfurization detection resistor. A sulfurization detection resistor includes an insulated substrate having a rectangular parallelepiped shape, a first front electrode and a second front electrode formed at both ends on a main surface of the insulated substrate, multiple sulfurization detecting conductors connected in parallel to the first front electrode, multiple resistive elements connected between the sulfurization detecting conductors and the second front electrode, and a protective film formed to partially cover the sulfurization detecting conductors and entirely cover the resistive elements. The sulfurization detecting conductors have their sulfurization detecting portions exposed out of the protective film, and different timings are set for these sulfurization detecting portions respectively to become disconnected depending on a cumulative amount of sulfurization.

10 Claims, 12 Drawing Sheets

(51) Int. Cl.
  *H01C 17/22* (2006.01)
  *H01C 17/28* (2006.01)
  *H01C 7/00* (2006.01)

(56) References Cited

U.S. PATENT DOCUMENTS

2016/0356698 A1* 12/2016 Chou .................... G01N 17/04
2018/0259442 A1   9/2018 Minamitani
2020/0066429 A1*  2/2020 Imahashi ............. H01C 17/006

FOREIGN PATENT DOCUMENTS

| | | | |
|---|---|---|---|
| JP | 2009-250611 A | | 10/2009 |
| JP | 2009250611 | * | 10/2009 |
| JP | 2014-153089 A | | 8/2014 |
| JP | 2014153089 | * | 8/2014 |
| JP | 2015-230922 A | | 12/2015 |
| JP | 2017-003285 A | | 1/2017 |
| JP | 2017-009360 A | | 1/2017 |
| WO | 2017/061182 A1 | | 4/2017 |

OTHER PUBLICATIONS

Jul. 27, 2021 International Preliminary Report on Patentability issued in International Patent Application No. PCT/JP2019/050690.

* cited by examiner

SULFURIZATION DETECTION RESISTOR AND MANUFACTURING METHOD THEREFOR

TECHNICAL FIELD

The present invention relates to a sulfurization detection resistor for detecting a cumulative amount of sulfurization in a corrosive environment and a manufacturing method for such sulfurization detection resistor.

BACKGROUND ART

For internal electrodes of electronic parts such as chip resistors, an Ag (silver) based electrode material with low resistivity is typically used. However, silver turns into silver sulfide when it is continued to be exposed to sulfide gas, and this causes a disconnection fault of electric parts because silver sulfide is an insulating material. Therefore, countermeasures against sulfurization have recently been taken, such as forming electrodes that are resistant to sulfurization by adding Pd (palladium) or Au (gold) to Ag or creating an electrode structure in which sulfide gas hardly reaches the electrode.

Nevertheless, even if such countermeasures against sulfurization have been taken for electronic parts, it is difficult to prevent disconnection completely in a situation where the electronic parts have been being exposed in a sulfide gas atmosphere for a long period or exposed to high concentration sulfide gas. Hence, it becomes necessary to detect a disconnection before it happens and prevent failure occurrence at an unexpected timing.

Therefore, a sulfurization detection sensor has heretofore been proposed that detects a cumulative degree of sulfurization of electronic parts and allows detecting a risk of failure before an electronic part fails, such as becoming disconnected, affected by sulfurization, as described in Patent Literature 1.

The sulfurization detection sensor described in Patent Literature 1 has a structure including a sulfurization detector that is made principally of Ag, formed on an insulated substrate, a transparent protective film that is permeable with sulfide gas, formed to cover the sulfurization detector, and end face electrodes formed to connect with the sulfurization detector at both ends of the insulated substrate. After mounting the thus structured sulfurization detection sensor together with other electronic parts on a printed wiring board, the printed wiring board is used in an atmosphere including sulfide gas. With passage of time, the sulfide gas permeates through the protective film of the sulfurization detection sensor and contacts the sulfurization detector while other electronic parts are affected by sulfurization, and, consequently, the color of the sulfurization detector changes depending on the concentration of sulfide gas and elapsed time. This allows for detecting a degree of sulfurization by visually seeing a change in the color of the sulfurization detector through the protective film, detecting light reflected from the sulfurization detector after irradiating the top surface of the sulfurization detection sensor with light, or detecting a change in the resistance value of the sulfurization detector.

CITATION LIST

Patent Literature

Patent Literature 1: Japanese Patent Application Laid-Open No. 2009-250611

SUMMARY OF INVENTION

Technical Problem

However, since there is a subtle change in the color of the sulfurization detector affected by sulfide gas, it is difficult for a worker to detect a degree of sulfurization accurately by visual perception. Detecting a degree of sulfurization based on light reflected from the sulfurization detector has a problem in which large-scale equipment for detection is required separately. It is also difficult to detect a degree of sulfurization based on a change in the resistance value of the sulfurization detector because of the following reasons: there is a subtle change in the resistance value of the sulfurization detector with an increase in the cumulative amount of the sulfurization because the sulfurization detector is a conductor that is made principally of Ag whose resistivity is low; and moreover, the temperature characteristic (TCR) of Ag is very poor and its resistance value changes to a large extent with temperature.

The prevent invention has been developed in view of actual circumstances of prior art as described above. A first object of the invention is to provide a sulfurization detection resistor making it possible to detect a degree of sulfurization accurately and easily. A second object of the invention is to provide a manufacturing method for such sulfurization detection resistor.

Solution to Problem

To achieve the foregoing first object, a sulfurization detection resistor of the present invention includes an insulated substrate having a rectangular parallelepiped shape, a pair of front electrodes formed at both ends on a main surface of the insulated substrate, resistive elements and sulfurization detecting conductors, each resistive element and each sulfurization detecting conductor being formed in series between the pair of front electrodes, and a protective film formed to entirely cover the resistive elements and partially cover the sulfurization detecting conductors. The sulfurization detection resistor is characterized in that the multiple sulfurization detecting conductors are connected in parallel to the front electrodes and have their sulfurization detecting portions that are exposed out of the conductive film, and different timings are set for the multiple sulfurization detecting portions respectively to become disconnected depending on a cumulative amount of sulfurization.

In the thus structured sulfurization detection resistor, multiple sets of resistive elements and sulfurization detecting conductors, each resistive element and each sulfurization detecting conductor being connected in series, are connected in parallel between the pair of front electrodes. Different timings are set for the sulfurization detecting conductors in each set to become disconnected depending on the cumulative amount of sulfurization. Accordingly, the resistance value between the pair of front electrode changes stepwisely and a degree of sulfurization can be detected accurately and easily.

In the sulfurization detection resistor structured as above, it is preferable that the multiple sulfurization detecting portions have identical surface areas that are exposed out of the conductive film. This allows sulfide gas to affect the sulfurization detecting portions in each set under the same condition.

Also, in the sulfurization detection resistor structured as above, as means for differentiating the timing for the multiple sulfurization detecting portions to become disconnected respectively, it is expedient to make the multiple sulfurization detecting conductors have respectively different material compositions. In this case, the multiple sulfurization detecting conductors should be formed with an electrode material having principally Ag but with different contents of Pd; it is thus possible to form a sulfurization detecting conductor that is harder to be sulfurized among them.

Also, in the sulfurization detection resistor structured as above, as other means for differentiating the timing for the multiple sulfurization detecting portions to become disconnected respectively, it is also expedient to make the multiple sulfurization detecting conductors have respectively different film thicknesses or it is also expedient to make the multiple sulfurization detecting conductors have respectively different material compositions and film thicknesses.

Also, in the sulfurization detection resistor structured as above, the protective film is formed to cover connections that connect the multiple sulfurization detecting conductors with the front electrodes. Even if some ingredient that adversely affects the detection of resistance value has spread from the front electrodes to the connections with the sulfurization detecting conductors, it is made possible to detect a change in the resistance value accurately because the connections are covered by the protective film.

Also, in the sulfurization detection resistor structured as above, the protective film is formed between the multiple sulfurization detecting portions arranged in parallel. Thus, it is made possible to prevent a short circuit between neighboring sulfurization detecting portions by migration.

Also, in the sulfurization detection resistor structured as above, a conduction ensuring circuit section is formed in parallel with the sulfurization detecting conductors between the pair of front electrodes, the conduction ensuring circuit section includes a resistive element and a conductor connected in series, and both the resistive element and the conductor are covered by the protective film. Thus, it is made possible to ensure conduction between both the front electrodes by the conduction ensuring circuit section even in a condition where all the multiple sulfurization detecting portions have become disconnected.

Also, in the sulfurization detection resistor structured as above, in regard to the resistive elements and the sulfurization detecting conductors, each resistive element and each sulfurization detecting conductor being formed in series between the pair of front electrodes, a trimming groove is formed in each resistive element and each sulfurization detecting conductor and a conductor for measurement are connected across each resistive element at either end thereof. When trimming the resistance value of a resistive element in each set, it is made possible to perform the trimming while bringing probes into contact with a sulfurization detecting conductor and a conductor for measurement connected across each individual resistive element at either end thereof.

In the case just above mentioned, the conductor for measurement is a sulfurization detecting conductor, and sulfurization detecting portions having identical surface areas are defined respectively in a pair of conductors for measurement connected across each resistive element at either end thereof. Thus, it is made possible to increase the accuracy of detecting a degree of sulfurization because one resistive element is combined with two sulfurization detecting portions.

To achieve the foregoing second object, a sulfurization detection resistor manufacturing method according to the present invention includes: a series circuit section forming step of forming multiple series circuit sections in parallel on a main surface of an insulated substrate such that sulfurization detecting conductors are connected across a resistive element at either end thereof; a resistance value trimming step of bringing probes into contact with a pair of the sulfurization detecting conductors in each of the series circuit sections and adjusting a resistance value of each individual one of the multiple resistive elements; after the resistance value trimming step, a front electrode forming step of forming a pair of front electrodes at both ends on the main surface of the insulated substrate to connect the multiple sulfurization detecting conductors arranged in parallel; and a protective film forming step of forming a protective film to entirely cover the resistive elements and partially cover the sulfurization detecting conductors, wherein the resistive elements and the sulfurization detecting conductors are comprised in the multiple series circuit sections. The sulfurization detection resistor manufacturing method is characterized in that, in the protective film forming step, sulfurization detecting portions are defined to be exposed out of the protective film respectively in the sulfurization detecting conductors comprised in the multiple series circuit sections, and different timings are set for the multiple sulfurization detecting portions respectively to become disconnected depending on a cumulative amount of sulfurization.

Also, to achieve the foregoing second object, a sulfurization detection resistor manufacturing method according to the present invention includes: a front electrode forming step of forming multiple pairs of opposing front electrodes in a separated state at both ends on a main surface of an insulated substrate; a series circuit section forming step of forming resistive elements and sulfurization detecting conductors such that each resistive element and each sulfurization detecting conductor are connected in series between the multiple pairs of the front electrodes, respectively; a resistance value trimming step of bringing probes into contact with the multiple pairs of the front electrodes and adjusting a resistance value of each individual one of the multiple resistive elements; and, after the resistance value trimming step, a protective film forming step of forming a protective film to entirely cover the resistive elements and partially cover the sulfurization detecting conductors, wherein the resistive elements and the sulfurization detecting conductors are comprised in the multiple series circuit sections. The sulfurization detection resistor manufacturing method is characterized in that, in the protective film forming step, sulfurization detecting portions are defined to be exposed out of the protective film respectively in the sulfurization detecting conductors comprised in the multiple series circuit sections and different timings are set for the multiple sulfurization detecting portions respectively to become disconnected depending on a cumulative amount of sulfurization.

Advantageous Effects of Invention

According to the present invention, it is possible to provide a sulfurization detection resistor making it possible to detect a degree of sulfurization accurately and easily.

DESCRIPTION OF EMBODIMENT

Figure 1:
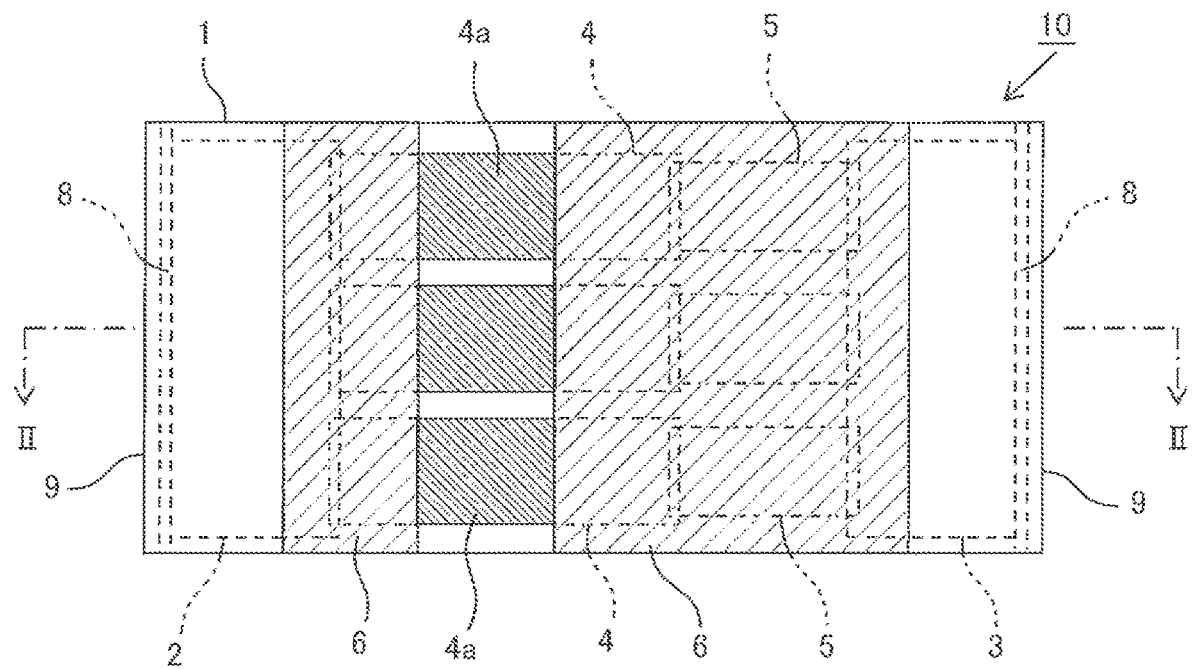
FIG. 1 is a plan view of a sulfurization detection resistor pertaining to a first embodiment example of the present invention.

In the following, embodiments of the present invention are described with reference to the drawings. FIG. 1 is a plan view of a sulfurization detection resistor pertaining to a first embodiment example of the present invention and FIG. 2 is a cross-sectional view taken along a line II-II in FIG. 1.

Figure 2:
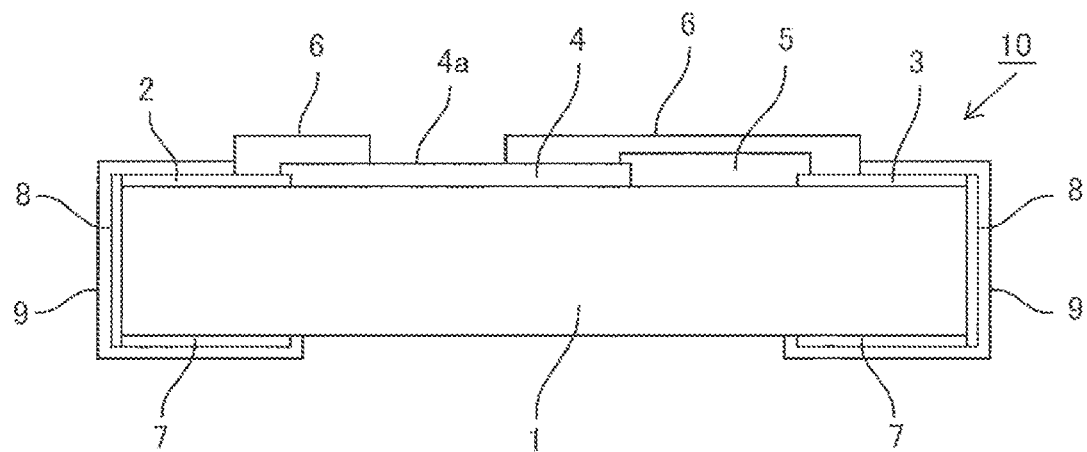
FIG. 2 is a cross-sectional view taken along a line II-II in FIG. 1.

As depicted in FIG. 1 and FIG. 2, the sulfurization detection resistor 10 pertaining to the first embodiment example is principally comprised of an insulated substrate 1 having a rectangular parallelepiped shape, a first front electrode 2 and a second front electrode 3 provided on the front surface of the insulated substrate 1 at both ends in its longitudinal direction, multiple (three in this embodiment) sulfurization detecting conductors 4 connected in parallel to the first front electrode 2, multiple resistive elements 5 connected between the respective sulfurization detecting conductors 4 and the second front electrode 3, a protective film 6 partially covering the respective sulfurization detecting conductors 4 and entirely covering the respective resistive elements 5, a pair of back electrodes 7 provided on the back surface of the insulated substrate 1 at both ends in its longitudinal direction, a pair of end face electrodes 8 provided on both longitudinal end faces of the insulated substrate 1, and external electrodes 9 provided on the surfaces of the end face electrodes 8.

The insulated substrate 1 is one of many ones into which a large-sized substrate, which will be described later, is separated along vertical and horizontal separation trenches. The large-sized substrate is made principally of alumina and it is a ceramics substrate that is made principally of alumina.

A pair of the first front electrode 2 and the second front electrode 3 is screen printed with an Ag-based paste having principally silver, followed by drying and firing. The first front electrode 2 and the second front electrode 3 are formed at both longitudinal ends of the insulated substrate 1 so as to face each other across a predetermined interval. The pair of back electrodes 7 is also screen printed with the Ag-based paste having principally silver, followed by drying and firing. These back electrodes 7 are formed in positions corresponding to the positions of the first front electrode 2 and the second front electrode 3 on the front surface of the insulated substrate 1.

Three sulfurization detecting conductors 4 connected in parallel to the first front electrode 2 are screen printed with the Ag-based paste having principally silver, followed by drying and firing; they differ from one another in terms of the content of Pd (palladium) added to the Ag paste. In particular, a sulfurization detecting conductor 4 which is positioned at top in FIG. 1 has the Ag paste containing no Pd, a sulfurization detecting conductor 4 which is positioned at middle in FIG. 1 has the Ag paste with a Pd content of 5%, and a sulfurization detecting conductor 4 which is positioned at bottom in FIG. 1 sulfurization detecting conductors 4 has the Ag paste with a Pd content of 10%.

The multiple resistive elements 5 are screen printed with a resistive paste such as a ruthenium oxide paste, followed by drying and firing. All the resistance values of these resistive elements are set to be equal. One end of each resistive element 5 is connected to a sulfurization detecting conductor 4 and the other end thereof is connected to the second front electrode 3. Three series circuit sections each including one set of a sulfurization detecting conductor 4 and a resistive element 5 are connected in parallel between the first front electrode 2 and the second front electrode 3.

The protective film 6 has two layers, namely, an undercoat layer and an overcoat layer. The undercoat layer is screen printed with a glass paste, followed by drying and firing. The overcoat layer is screen printed with an epoxy-based resin paste, followed by thermal curing. This protective film 6 is formed to partially cover the sulfurization detecting conductors 4 except for their middle portions and entirely cover the resistive elements 5. The middle portions of the sulfurization detecting conductors 4, exposed out of the protective film 6, define sulfurization detecting portions 4a having identical surface areas. Note that, of two parts of the protective film 6, separating across the sulfurization detecting portions 4a, one part (depicted at left) of the protective film 6 extends to a position where it covers connections that connect the first front electrode 2 with the sulfurization detecting conductors 4 and the other part (depicted at right) of the protective film 6 extends to a position where it covers connections that connect the second front electrode 3 with the resistive elements 5.

The pair of end face electrodes 8 is formed by sputtering a Ni/Cr layer or applying an Ag-based paste onto the end faces of the insulated substrate 1, followed by thermal curing. These end face electrodes 8 are formed to conduct current between the first front electrode 2 and its corresponding back electrode 7 and between the second front electrode 3 and its corresponding back electrode 7.

The pair of external electrodes 9 has two layers, namely, a barrier layer and an external connection layer. The barrier layer is a Ni plating layer formed by electroplating and the external connection layer is a Sn plating layer formed by electroplating. These external electrodes 9 provide covering of the surfaces of the first front electrode 2 exposed out of the protective film 6 and the second front electrode 3 and the surfaces of the back electrodes 7 and the end face electrodes 8.

Then, a manufacturing process of this sulfurization detection resistor 10 is described with FIG. 3 and FIG. 4. Here, FIG. 3(a) to FIG. 3(f) illustrate plan views of the front surface of a large-sized substrate for use in the manufacturing process and FIG. 4(a) to FIG. 4(f) illustrate cross-sectional views for one chip taken along a line A-A in FIG. 3(a) to FIG. 3(f).

First, a large-sized substrate to be separated into many insulated substrates 1 is prepared. This large-sized substrate is provided with a grid of primary and secondary separation trenches in advance and each of cells defined by both separation trenches is one chip area. A large-sized substrate 10A as a representative portion corresponding to one chip area is illustrated in FIG. 3; however, practically, for a large-sized substrate whose size corresponds to a total of the areas of many chips, a series of process steps which will be described below are performed in a single sequence.

Figure 3A:
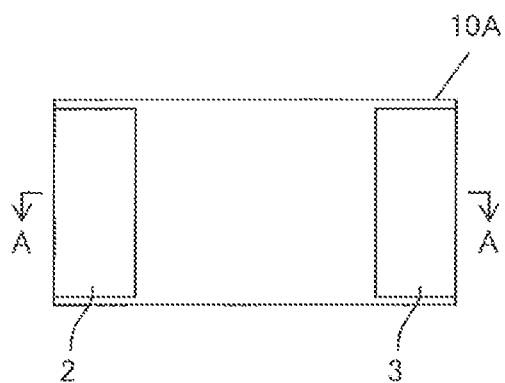
FIG. 3 is plan views illustrating a manufacturing process of the sulfurization detection resistor.
Figure 4A:
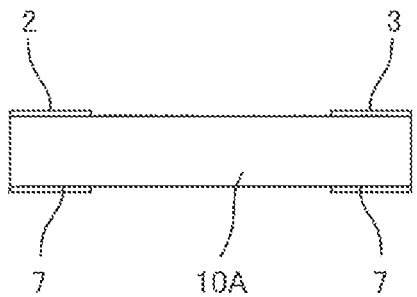
FIG. 4 is cross-sectional views illustrating the manufacturing process of the sulfurization detection resistor.

Specifically, as illustrated in FIG. 3(a) and FIG. 4(a), the pair of the front electrode 2 and the second front electrode 3 is formed by screen printing an Ag-based paste (Ag—Pd 20%) on the front surface of this large-sized substrate 10A, followed by drying and firing the paste. Additionally, simultaneously with or before or after forming the front electrodes, the pair of the back electrodes 7 corresponding to the first front electrode 2 and the second front electrode 3 is formed by screen printing the Ag-based paste (Ag—Pd 20%) on the back surface of the large-sized substrate 10A, followed by drying and firing the paste.

Figure 3D:
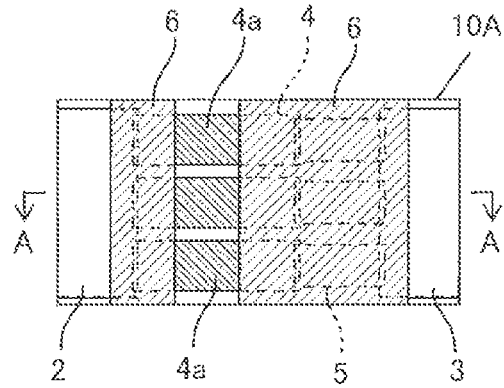
Figure 3B:
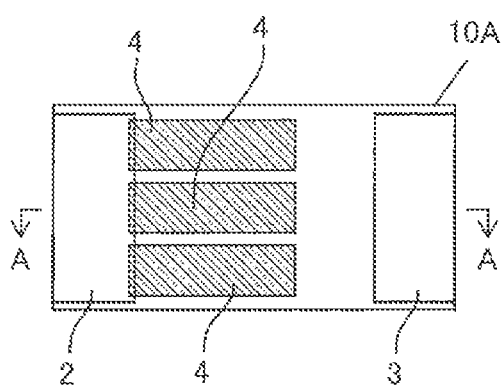
Figure 4D:
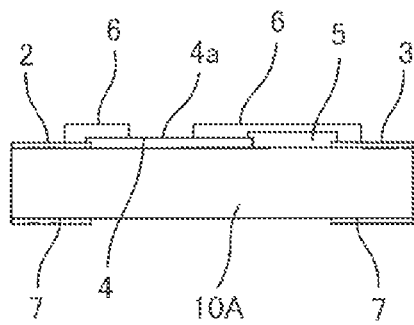
Figure 4B:
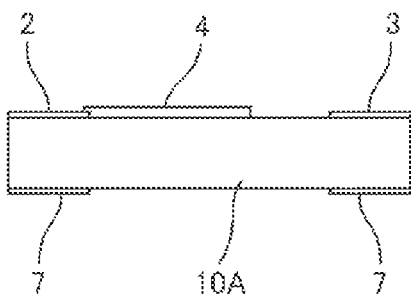

Next, as illustrated in FIG. 3(b) and FIG. 4(b), three sulfurization detecting conductors 4 that are connected to the first front electrode 2 are formed by screen printing an Ag-based paste having principally Ag on the front surface of the large-sized substrate 10A, followed by drying and firing the paste. Here, the content of Pd included in the Ag paste differs among the three sulfurization detecting conductors 4. First, the Ag paste containing no Pd is screen printed and dried. After that, the Ag-based paste with a Pd content of 5% is screen printed and dried. Finally, the Ag-based paste with a Pd content of 10% is screen printed, dried, and fired. In this way, the three sulfurization detecting conductors 4 connected in parallel to the first front electrode 2 are formed.

Figure 3E:
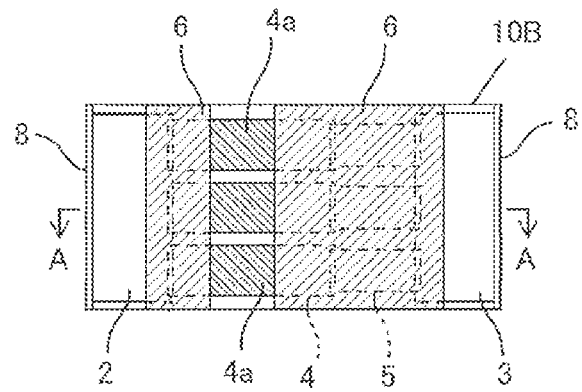
Figure 3C:
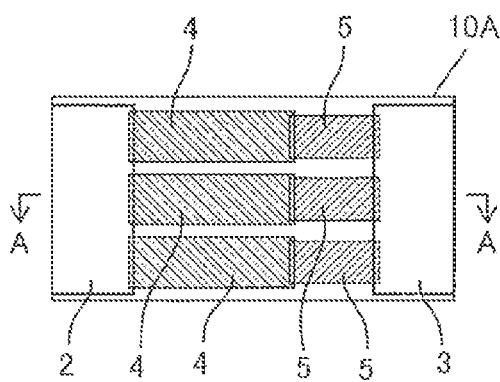
Figure 4E:
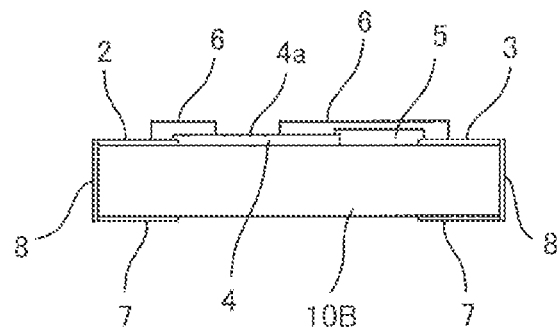
Figure 4C:
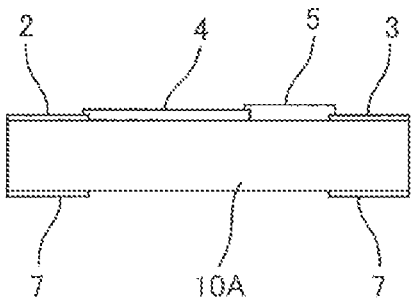

Next, as illustrated in FIG. 3(c) and FIG. 4(c), three resistive elements 5 whose one ends connect to the sulfurization detecting conductors 4 and whose other ends connect to the second front electrode 3 are formed by screen printing a resistive paste such as a ruthenium oxide paste and drying and firing the paste. Since these resistive elements 5 are formed together using the same material, the resistance values of the resistive elements 5 connected to the sulfurization detecting conductors 4 are equal.

Next, in a region covering all the resistive elements 5, the undercoat layer is formed by screen printing a glass plate, followed by drying and firing the glass paste and trimming grooves, which are not illustrated, are formed through the undercoat layer into the resistive elements 5, as needed, and their resistance values are adjusted. After that, the two-layered protective film 6 partially covering the sulfurization detecting conductors 4 and entirely covering the resistive elements 5 is formed by screen printing an epoxy-based resin paste over the undercoat layer and thermally curing the paste, as illustrated in FIG. 3(d) and FIG. 4(d). When the protective film has been formed, the sulfurization detecting portions 4a are defined to be exposed out of the protective film 6 in the middle portions of all the sulfurization detecting conductors 4; these sulfurization detecting portions 4a have identical surface areas that are exposed out of the protective film 6. Also, connections that connect the first front electrode 2 with the sulfurization detecting conductors 4 are covered by the protective film 6 and connections that connect the second front electrode 3 with the resistive elements 5 are also covered by the protective film 6.

Next, all the sulfurization detecting portions 4a are covered by masking made of a soluble material or the like, which is not illustrated. In this state, the large-sized substrate 10A is primarily separated into strip-like substrates 10B along primary separation trenches. After that, by sputtering a Ni/Cr layer onto the cut surfaces of the strip-like substrates 10B, the end face electrodes 8 are formed, one of which connects the first front electrode 2 and its back electrode 7 and the other of which connects the second front electrode 3 and its back electrode 7, as illustrated in FIG. 3(e) and FIG. 4(e). Note that the end face electrodes 8 may be formed by applying an Ag-based paste onto the cut surfaces and thermally curing the paste, instead of sputtering the Ni/Cr layer onto the cut surfaces of the strip-like substrates 10B.

Figure 3F:
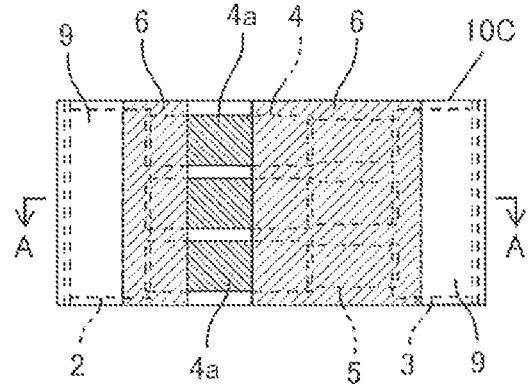
Figure 4F:
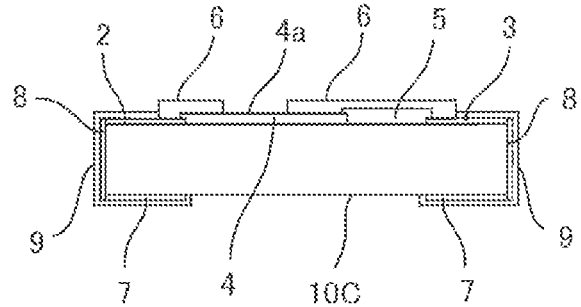

Next, the strip-like substrates 10B are secondarily separated into multiple chip-sized substrates 10C along secondary separation trenches, and Ni—Sn plating layers are formed by applying electroplating to these chip-sized substrates 10C, followed by removal of the abovementioned masking using a solvent. Thereby, the external electrodes 9 are formed over the surfaces of the first front electrode 2, the second front electrode 3, the back electrodes 7, and the end face electrodes 8, as illustrated in FIG. 3(f) and FIG. 4(f), and the sulfurization detection resistor 10 which is depicted in FIGS. 1 and 2 is completed.

Figure 5:
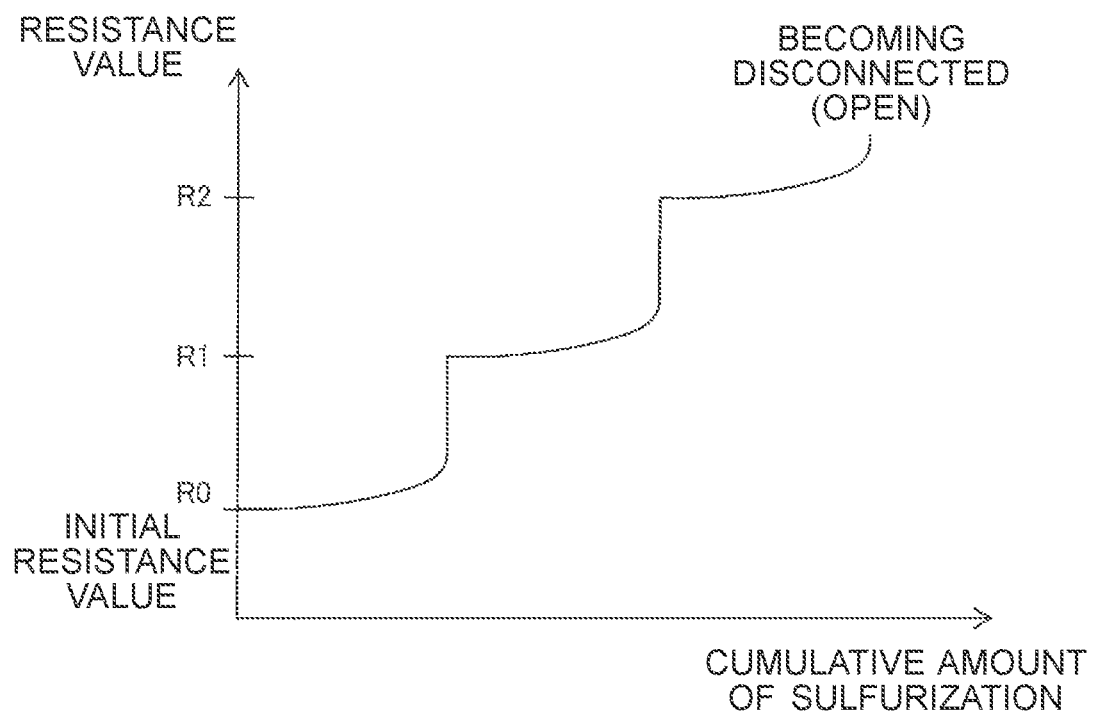
FIG. 5 is an explanatory diagram representing a relationship between a cumulative amount of sulfurization and a resistance value with regard to the sulfurization detection resistor.

FIG. 5 is an explanatory diagram representing a relationship between a cumulative amount of sulfurization and a resistance value when the sulfurization detection resistor 10 pertaining to the present embodiment example is placed in an atmosphere of sulfide gas. As represented in FIG. 5, in an initial state before the sulfurization detection resistor 10 is exposed to sulfide gas, since the three resistive elements 5 are in a parallel connection state between the first front electrode 2 and the second front electrode 3, assuming that each resistive element 5 has a resistance value R of 1KΩ, initial resistance value of the sulfurization detection resistor 10 is R0=(R/3)≅333Ω.

When this sulfurization detection resistor 10 is placed in an atmosphere including sulfide gas, the sulfurization detecting portions 4a of the respective sulfurization detecting conductors 4 come into contact with sulfide gas. As the cumulative amount of sulfurization increases, a sulfurization detecting conductor 4 that is the most likely to be sulfurized among the sulfurization detecting conductors 4 becomes disconnected at first. In the case of the present embodiment example, since a sulfurization detecting conductor 4 which is positioned at top in FIG. 1 has the Ag paste containing no Pd, this sulfurization detecting conductor 4 only becomes disconnected, whereas the remaining two sulfurization detecting conductors 4 remain conducting. Therefore, two resistive elements 5 connected to these sulfurization detecting conductors 4 remain in the parallel connection state between the first front electrode 2 and the second front electrode 3, and the resistance value of the sulfurization detection resistor 10 changes to R1=(R/2)=500Ω.

After one sulfurization detecting conductor 4 has become disconnected as above, as the cumulative amount of sulfurization further increases, a sulfurization detecting conductor 4 that is the second most likely to be sulfurized becomes disconnected. In the case of the present embodiment example, since a sulfurization detecting conductor 4 which is positioned at middle in FIG. 1 has the Ag-based paste with a Pd content of 5% and a sulfurization detecting conductor 4 which is positioned at bottom in FIG. 1 has the Ag-based paste with a Pd content of 10%, the sulfurization detecting conductor 4 at middle becomes disconnected, whereas the remaining one sulfurization detecting conductor 4 positioned at bottom remains conducting. Therefore, only one resistive element 5 connected to the sulfurization detecting conductor 4 at bottom remains in a connection state between the first front electrode 2 and the second front electrode 3, and the resistance value of the sulfurization detection resistor 10 changes to R2=R=1000Ω (1KΩ). Then, with a further increase in the cumulative amount of sulfurization, when the sulfurization detecting conductor 4 positioned at bottom in FIG. 1 also becomes disconnected, the resistance value of the sulfurization detection resistor 10 becomes open.

As described above, the sulfurization detection resistor 10 pertaining to the first embodiment example has a structure as below: with the assumption that a sulfurization detecting conductor 4 and a resistive element 5 connected in series form one set, and multiple sets of such series circuit sections are connected in parallel between the first front electrode 2 and the second front electrode 3. Different timings are set for the sulfurization detecting conductors 4 in each set to become disconnected depending on the cumulative amount of sulfurization. Accordingly, the resistance value of the sulfurization detection resistor 10 changes stepwisely according to the timings at which the multiple sulfurization detecting conductors 4 become disconnected respectively and a degree of sulfurization can be detected accurately and easily. Note that the series circuit sections, each corresponding to one set of a sulfurization detecting conductor 4 and a resistive element 5, connected in parallel between the first front electrode 2 and second front electrode 3 are not limited to three sets as in the present embodiment example and may be two sets or four or more sets.

In addition, in the sulfurization detection resistor 10 pertaining to the first embodiment example, the sulfurization detecting conductors 4 are made to have respectively different material compositions as means for differentiating the timing for the multiple sulfurization detecting conductors 4 to become disconnected respectively. In particular, an electrode material having principally Ag but with different contents of Pd is used. Therefore, by adjusting the Pd content, the sulfurization detecting conductors 4 can be formed easily, tailored for the intended use. Moreover, the sulfurization detecting portions 4a that are exposed out of the protective film 6 are defined in the multiple sulfurization detecting conductors 4. Since these sulfurization detecting portions 4a have identical surface areas exposed out of the protective film 6, it is possible to make sulfide gas affect the sulfurization detecting portions 4a under the same condition and the timing for each sulfurization detecting conductor 4 to become disconnected can be differentiated appropriately. Note that, as the means for differentiating the timing for the multiple sulfurization detecting conductors 4 to become disconnected, the sulfurization detecting conductors 4 may be made to have respectively different film thicknesses or may be made to have respectively different material compositions and film thicknesses, instead of making them to have different material compositions.

In addition, in the sulfurization detection resistor 10 pertaining to the first embodiment example, the protective film 6 is formed extending to the position where it covers the connections that connect the sulfurization detecting conductors 4 with the first front electrode 2. It is thus possible to prevent the sulfurization detecting conductors 4 from being eroded by solder during a mounting process. Also, even if composition change occurs due to spreading of some ingredient that adversely affects the detection of sulfurization around the connections that connect the first front electrode 2 with the sulfurization detecting conductors 4, the spreading will not reach the sulfurization detecting portions 4a and a change in the resistance value can be detected accurately.

Figure 6:
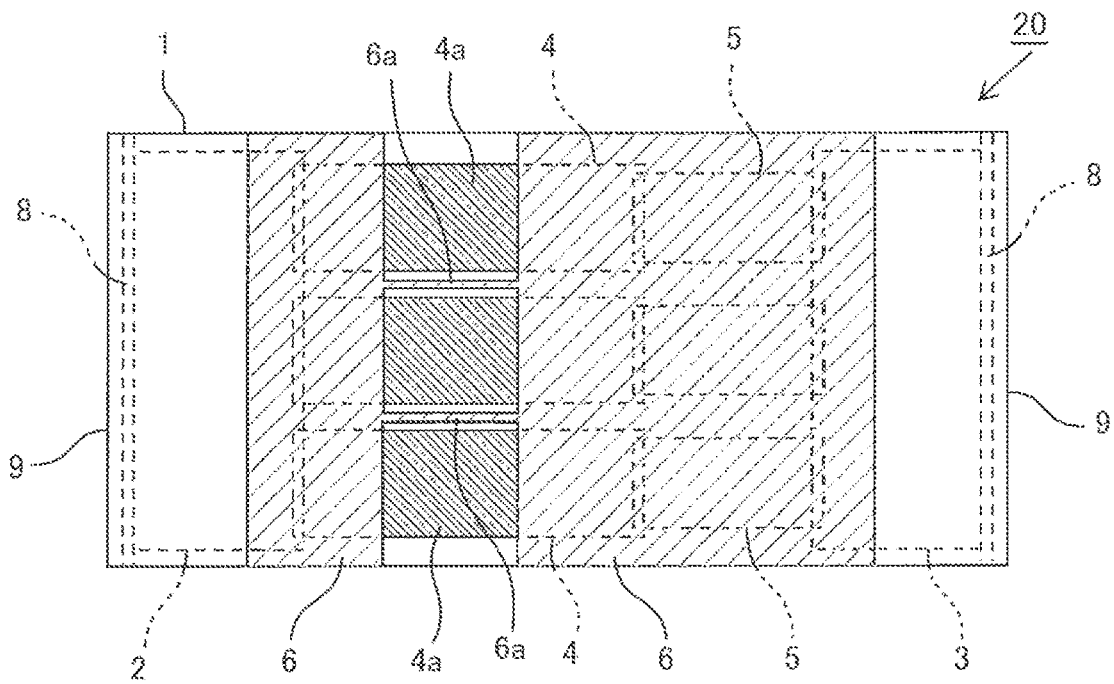
FIG. 6 is a plan view of a sulfurization detection resistor pertaining to a second embodiment example of the present invention.

FIG. 6 is a plan view of a sulfurization detection resistor 20 pertaining to a second embodiment example of the present invention, and its components corresponding to those in FIG. 1 are assigned identical reference numerals and their duplicated description is omitted.

For the sulfurization detection resistor 20 pertaining to the second embodiment example, as depicted in FIG. 6, strip portions 6a are formed as a part of the protective film 6, positioned between each sulfurization detecting portion 4a. The resistor structure other than above is basically the same as the sulfurization detection resistor 10 pertaining to the first embodiment example.

In the thus structured sulfurization detection resistor 20 pertaining to the second embodiment example, even if the distance between neighboring ones of the sulfurization detecting portions 4a arranged in parallel between the first front electrode 2 and the second front electrode 3 has been shortened, the strip portions 6a can prevent a short circuit caused by migration between neighboring sulfurization detecting portions 4a. Note that, although the width dimension of the strip portions 6a may be narrower than the interval between neighboring sulfurization detecting portions 4a, forming the strip portions 6a with their width dimension equivalent to or somewhat wider than the interval between neighboring sulfurization detecting portions 4a can prevent a short circuit caused by migration more effectively.

Figure 7:
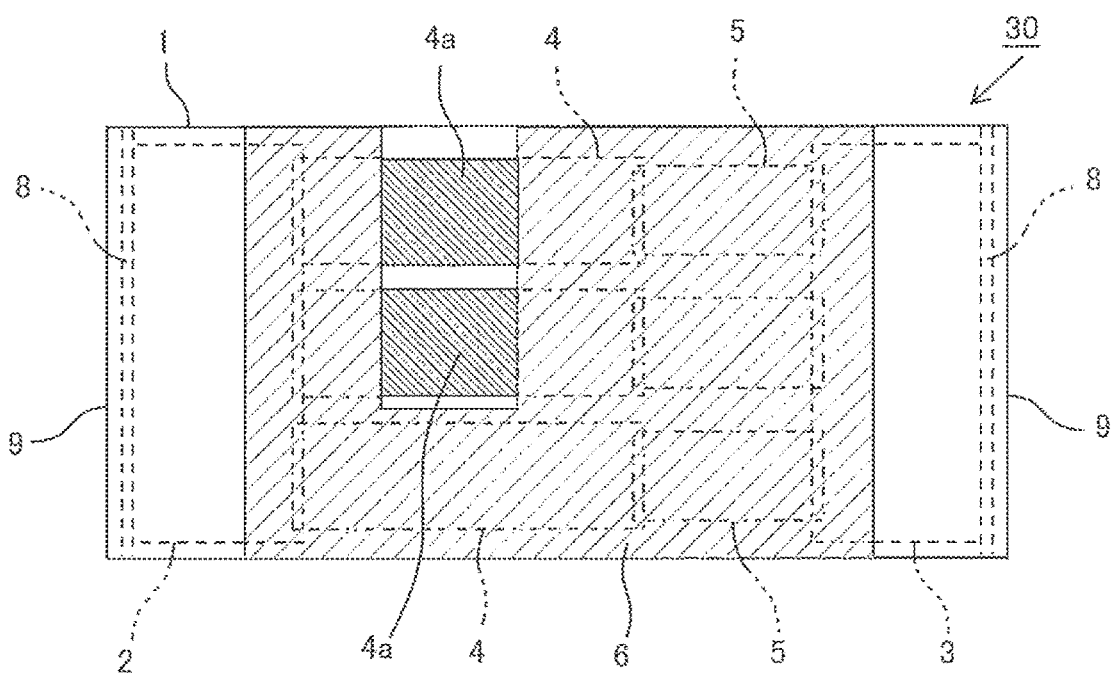
FIG. 7 is a plan view of a sulfurization detection resistor pertaining to a third embodiment example of the present invention.

FIG. 7 is a plan view of a sulfurization detection resistor 30 pertaining to a third embodiment example of the present invention, and its components corresponding to those in FIG. 1 are assigned identical reference numerals and their duplicated description is omitted.

For the sulfurization detection resistor 30 pertaining to the third embodiment example, as depicted in FIG. 7, among the multiple sets of sulfurization detecting conductors 4 and resistive elements 5 connected in parallel between the first front electrode 2 and the second front electrode 3, for example, only the sulfurization detecting conductors 4 positioned at top and middle in the figure have the sulfurization detecting portions 4a defined to be exposed out of the protective film 6. The sulfurization detecting conductor 4 at bottom is covered by the protective film 6 and no sulfurization detecting portion is defined therein. This sulfurization detecting conductor 4 and a resistive element 5 connected to it constitute a conduction ensuring circuit section. The resistor structure other than above is basically the same as the sulfurization detection resistor 10 pertaining to the first embodiment example.

In the thus structured sulfurization detection resistor 30 pertaining to the third embodiment example, the sulfurization detecting conductor 4 in the conduction ensuring circuit section covered by the protective film 6 does not have a sulfurization detecting portion that comes into contact with sulfide gas. Therefore, even after the sulfurization detecting portions 4 of two sulfurization detecting conductors 4 have become disconnected at different timings with an increase in the cumulative amount of sulfurization, it is possible to ensure conduction between both the front electrodes 2 and 3 by the sulfurization detecting conductor 4 in the conduction ensuring circuit section. Note that, since the sulfurization detecting conductor 4 in the conduction ensuring circuit section does not participate in the detection of sulfide gas, a conductor may be formed integrally with the first front electrode 2 so as to extend toward the second front electrode 3 and a resistive element 5 may be connected to this conductor, instead of forming the sulfurization detecting conductor 4 by printing.

Figure 8:
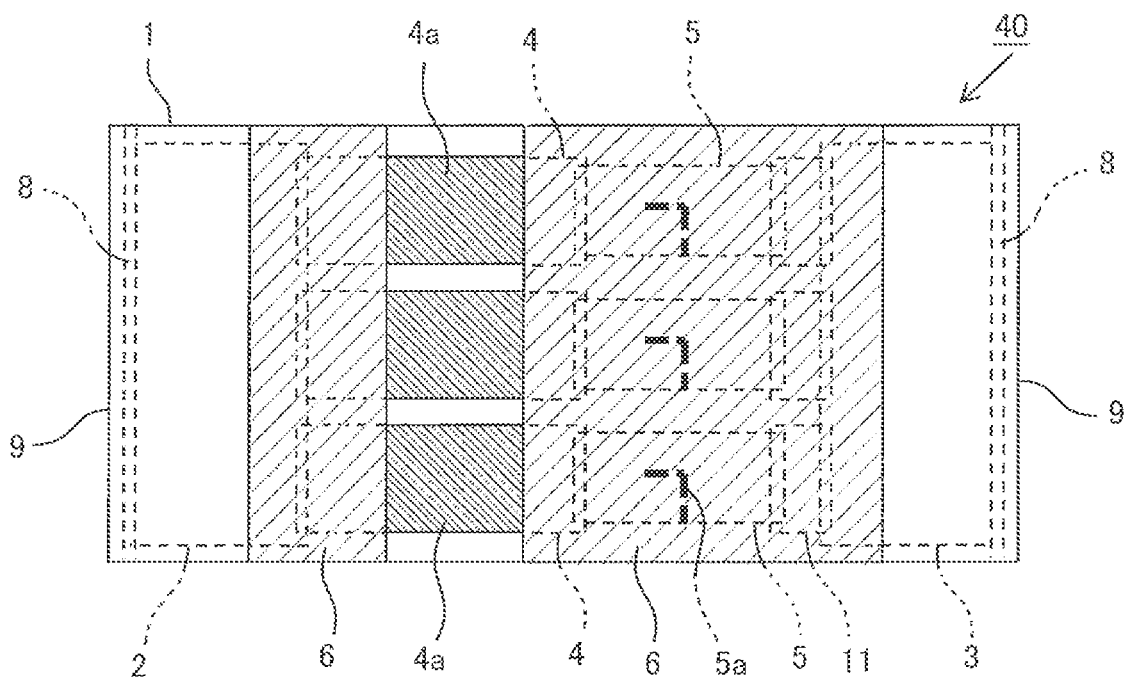
FIG. 8 is a plan view of a sulfurization detection resistor pertaining to a fourth embodiment example of the present invention.

FIG. 8 is a plan view of a sulfurization detection resistor 40 pertaining to a fourth embodiment example of the present invention, and its components corresponding to those in FIG. 1 are assigned identical reference numerals and their duplicated description is omitted.

For the sulfurization detection resistor 40 pertaining to the fourth embodiment example, as depicted in FIG. 8, three conductors 11 for measurement are connected in parallel to the second front electrode 3 so as to correspond to three sulfurization detecting conductors 4 connected in parallel to the first front electrode 2. Each resistive element 5 is connected in series between the corresponding ones of the sulfurization detecting conductors 4 and the conductors 11 for measurement. Trimming grooves 5a for resistance value adjustment are formed in all the resistive elements 5. The resistor structure other than the above is basically the same as the sulfurization detection resistor 10 pertaining to the first embodiment example.

Then, a manufacturing process of this sulfurization detection resistor 40 is described with FIG. 9 and FIG. 10. Here, FIG. 9(a) to FIG. 9(f) illustrate plan views of the front surface of a large-sized substrate for use in the manufacturing process and FIG. 10(a) to FIG. 10(f) illustrate cross-sectional views for one chip taken along a line B-B in FIG. 9(a) to FIG. 9(f).

Figure 9A:
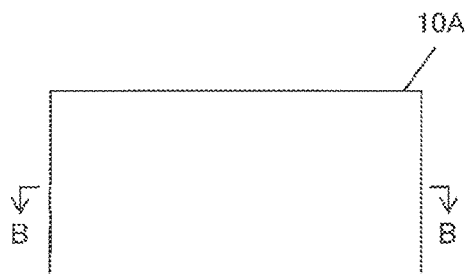
FIG. 9 is plan views illustrating a manufacturing process of the sulfurization detection resistor.
Figure 10A:
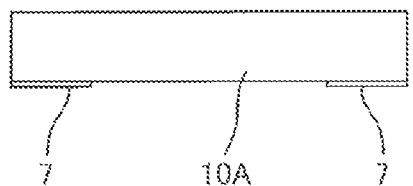
FIG. 10 is cross-sectional views illustrating the manufacturing process of the sulfurization detection resistor.

First, as illustrated in FIG. 9(a) and FIG. 10(a), a pair of back electrodes 7 corresponding to the first front electrode 2 and the second front electrode 3, which will be formed later, is formed by screen printing an Ag-based paste (Ag—Pd 20%) on the back surface of a large-sized substrate 10A, followed by drying and firing the paste.

Figure 9E:
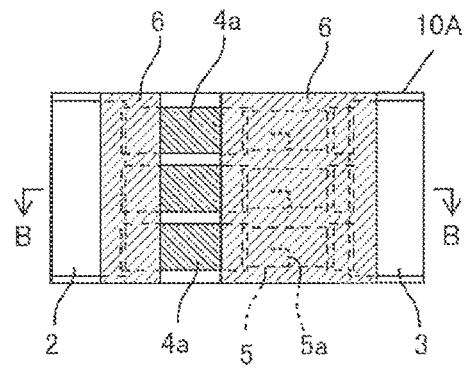
Figure 9B:
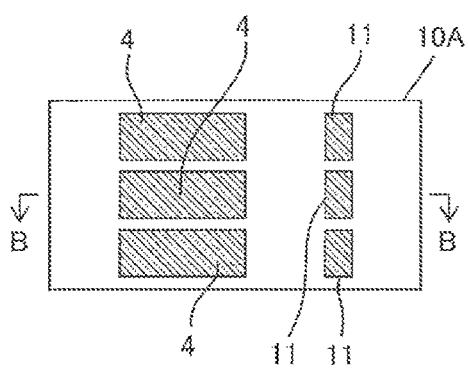
Figure 10E:
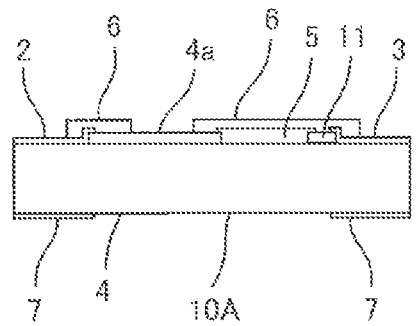
Figure 10B:
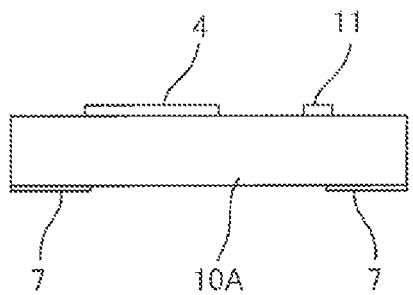

Next, as illustrated in FIG. 9(b) and FIG. 10(b), three sulfurization detecting conductors 4 to be connected to the first front electrode 2 which will be formed later and three conductors 11 for measurement to be connected to the second front electrode 3 which will be formed later are formed by screen printing an Ag-based paste having principally silver on the front surface of the large-sized substrate 10A, followed by drying and firing the paste. Here, the content of Pd included in the Ag paste differs among the three sulfurization detecting conductors 4. First, the Ag paste containing no Pd is screen printed and dried. After that, the Ag-based paste with a Pd content of 5% is screen printed and dried. Finally, the Ag-based paste with a Pd content of 10% is screen printed, dried, and fired. In this way, the three sulfurization detecting conductors 4 connected in parallel to the first front electrode 2 are formed. Note that the three conductors 11 for measurement may simultaneously formed of the same material as the sulfurization detecting conductors 4 corresponding to them or may separately be formed of the same material that is an Ag paste or Ag—Pd paste.

Figure 9F:
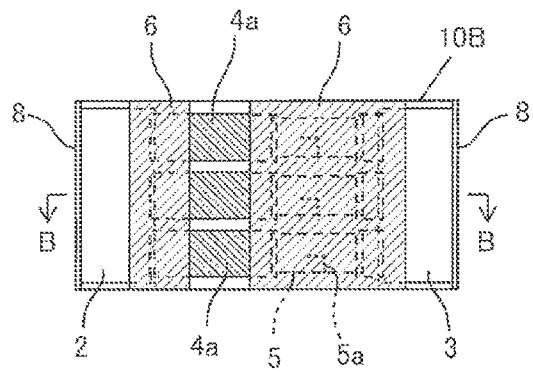
Figure 9C:
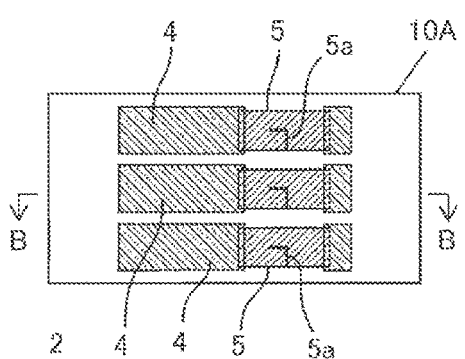
Figure 10F:
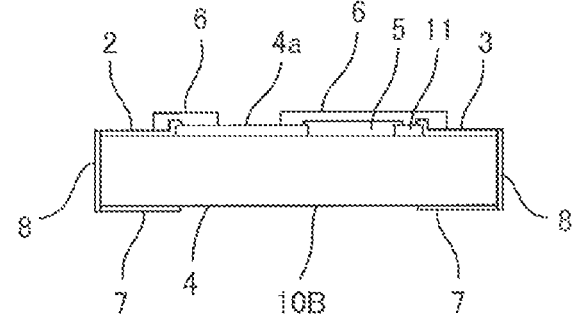
Figure 10C:
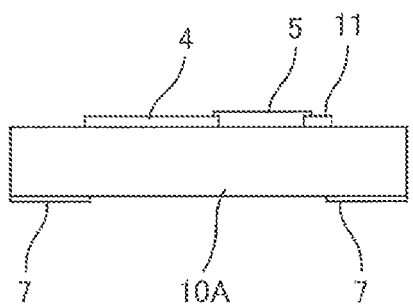

Next, as illustrated in FIG. 9(c) and FIG. 10(c), three sets of series circuit sections in which the sulfurization detecting conductors 4 and the conductors 11 for measurement are connected across the resistive elements 5 at either end thereof are formed by screen printing a resistive paste such as a ruthenium oxide paste and drying and firing the paste. Since these resistive elements 5 are formed together using the same material, the resistance values of the resistive elements 5 connected to the sulfurization detecting conductors 4 are equal. Next, in a region covering all the resistive elements 5, an undercoat layer, which is not illustrated, is formed by screen printing a glass plate and drying and firing the glass paste. After that, the trimming grooves 5a are formed through the undercoat layer into the resistive elements 5 and their resistance values are adjusted. For this adjustment, trimming adjustment of each resistive element 5 can be performed individually while bringing probes into contact with a sulfurization detecting conductor 4 and a conductor 11 for measurement connected across the resistive element 5 at either end thereof.

Figure 9G:
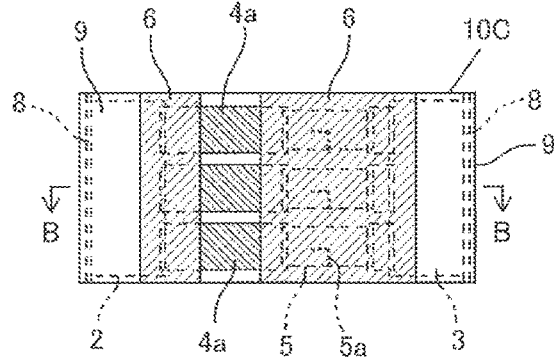
Figure 9D:
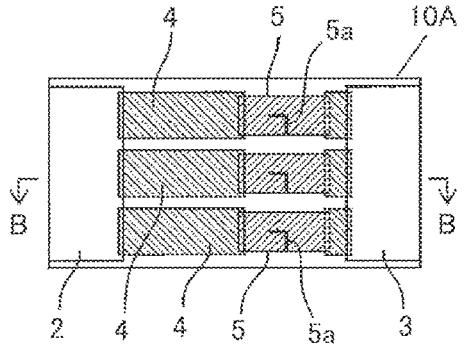
Figure 10G:
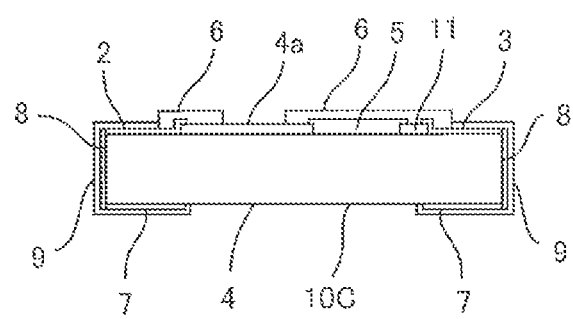
Figure 10D:
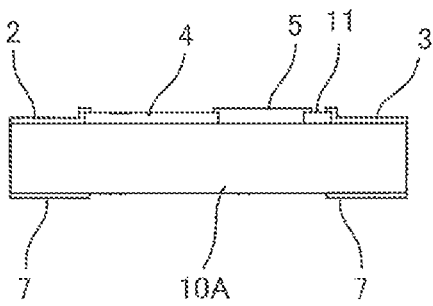

Next, as illustrated in FIG. 9(d) and FIG. 10(d), the first front electrode 2 connecting to the sulfurization detecting conductors 4 and the second front electrode 3 connecting to the conductors 11 for measurement are formed by screen printing the Ag-based paste (Ag—Pd 20%) on the front surface of the large-sized substrate 10A, followed by drying and firing the paste. At this time, the resistance value adjustment of the resistive elements 5 is already complete and, therefore, the first front electrode 2 and the second front electrode 3 may be formed by screen printing a conductive resin having Ag or the like and thermally curing the resin, taking account of resistance value drift.

After that, as illustrated in FIG. 9(e) and FIG. 10(e), the two-layered protective film 6 partially covering the sulfurization detecting conductors 4 and entirely covering the resistive elements 5 and the conductors 11 for measurement is formed by screen printing an epoxy-based resin paste over the undercoat layer and thermally curing the paste. At that time, the sulfurization detecting portions 4a are defined to be exposed out of the protective film 6 in the middle portions of all the sulfurization detecting conductors 4; these sulfurization detecting portions 4a have identical surface areas that are exposed out of the protective film 6. Also, connections that connect the first front electrode 2 with the sulfurization detecting conductors 4 are covered by the protective film 6 and connections that connect the second front electrode 3 with the conductors 11 for measurement are also covered by the protective film 6.

Next, all the sulfurization detecting portions 4a are covered by masking made of a soluble material or the like, which is not illustrated. In this state, the large-sized substrate 10A is primarily separated into strip-like substrates 10B along primary separation trenches. After that, by sputtering a Ni/Cr layer onto the cut surfaces of the strip-like substrates 10B, the end face electrodes 8 are formed, one of which connects the first front electrode 2 and its back electrode 7 and the other of which connects the second front electrode 3 and its back electrode 7, as illustrated in FIG. 9(f) and FIG. 10(f).

Next, the strip-like substrates 10B are secondarily separated into multiple chip-sized substrates 10C along secondary separation trenches and Ni—Sn plating layers are formed by applying electroplating to these chip-sized substrates 10C, followed by removal of the masking using a solvent. Thereby, the external electrodes 9 are formed over the surfaces of the first front electrode 2, the second front electrode 3, the back electrodes 7, and the end face electrodes 8, as illustrated in FIG. 9(g) and FIG. 10(g), and the sulfurization detection resistor 40 which is depicted in FIG. 8 is completed.

In the thus structured sulfurization detection resistor 40 pertaining to the fourth embodiment example, multiple series circuit sections in which the sulfurization detecting conductors 4 and the conductors 11 for measurement are connected in series across the resistive elements 5 at either end thereof are arranged in parallel between the pair of the front electrodes 2 and 3. Therefore, when trimming the resistance value of a resistive element 5 in each set, the trimming can be performed easily while bringing probes into contact with a sulfurization detecting conductor 4 and a conductor 11 for measurement connected across each individual resistive element 5 at either end thereof.

Figure 11:
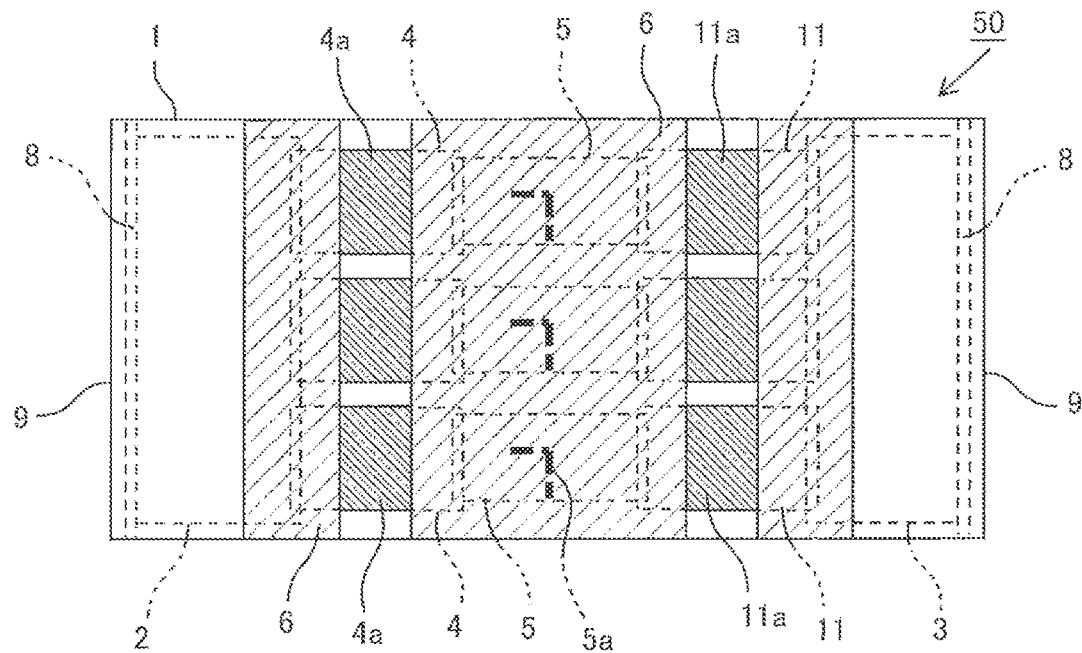
FIG. 11 is a plan view of a sulfurization detection resistor pertaining to a fifth embodiment example of the present invention.

FIG. 11 is a plan view of a sulfurization detection resistor 50 pertaining to a fifth embodiment example of the present invention, and its components corresponding to those in FIG. 8 are assigned identical reference numerals and their duplicated description is omitted.

For the sulfurization detection resistor 50 pertaining to the fifth embodiment example, as depicted in FIG. 11, a sulfurization detecting conductor 4 and conductors 11 for measurement made of the same material composition are connected across each resistive element 5 at either end thereof. In both the sulfurization detecting conductor 4 and the conductor 11 for measurement, sulfurization detecting portions 4a, 11a having identical surface areas are defined. The resistor structure other than the above is basically the same as the sulfurization detection resistor 40 pertaining to the fourth embodiment example.

In the thus structured sulfurization detection resistor 50 pertaining to the fifth embodiment example, the sulfurization detecting conductors 4 and the conductors 11 for measurement are connected across the resistive elements 5 arranged in parallel at either end of each resistive element 5. When trimming the resistance value of a resistive element 5 in each set, the trimming can be performed easily while bringing probes into contact with a sulfurization detecting conductor 4 and a conductor 11 for measurement connected across each individual resistive element 5 at either end thereof. Moreover, one resistive element 5 is combined with two sulfurization detecting portions 4a, 11a that become disconnected at the same timing; accordingly, the accuracy of detecting a degree of sulfurization will be increased.

Figure 12:
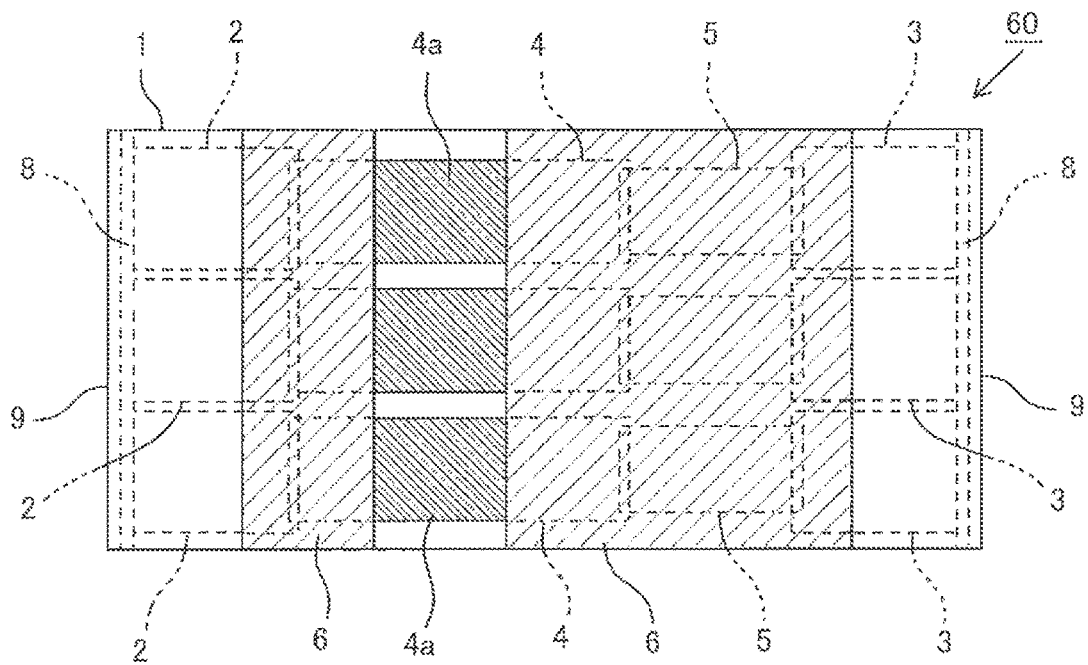
FIG. 12 is a plan view of a sulfurization detection resistor pertaining to a sixth embodiment example of the present invention.

FIG. 12 is a plan view of a sulfurization detection resistor 60 pertaining to a sixth embodiment example of the present invention, and its components corresponding to those in FIG. 1 are assigned identical reference numerals and their duplicated description is omitted.

For the sulfurization detection resistor 60 pertaining to the sixth embodiment example, as depicted in FIG. 12, first front electrodes 2 and second front electrodes 3 are formed in a respectively separated state at both ends of the insulated substrate 1. The first front electrodes 2 being separated and the second front electrodes 3 being separated are put in conduction by the end face electrodes 8. The resistor structure other than above is basically the same as the sulfurization detection resistor 10 pertaining to the first embodiment example.

Then, a manufacturing process of this sulfurization detection resistor 60 is described with FIG. 13 and FIG. 14. Here, FIG. 13(a) to FIG. 13(f) illustrate plan views of the front surface of a large-sized substrate for use in the manufacturing process and FIG. 14(a) to FIG. 14(f) illustrate cross-sectional views for one chip taken along a line C-C in FIG. 13(a) to FIG. 13(f).

Figure 13A:
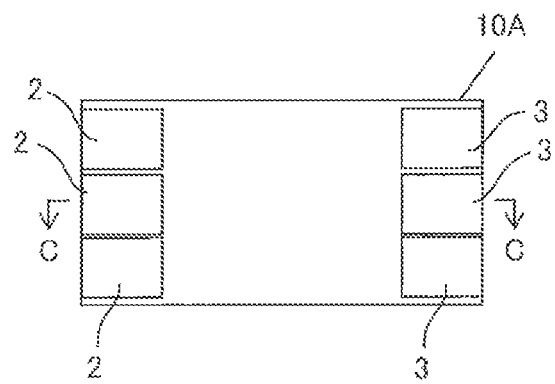
FIG. 13 is plan views illustrating a manufacturing process of the sulfurization detection resistor.
Figure 14A:
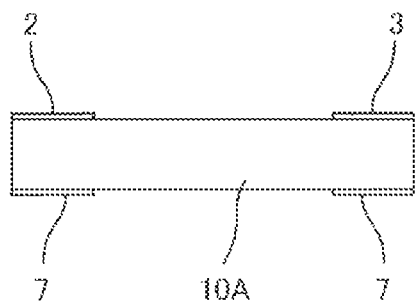
FIG. 14 is cross-sectional views illustrating the manufacturing process of the sulfurization detection resistor.

First, as illustrated in FIG. 13(a) and FIG. 14(a), three separated first front electrodes 2 and, likewise, three separated second front electrodes 3 are formed by screen printing an Ag-based paste (Ag—Pd 20%) on the front surface of a large-sized substrate 10A, followed by drying and firing the paste. Additionally, simultaneously with or before or after forming the front electrodes, a pair of back electrodes 7 is formed in positions corresponding to the positions of the first front electrodes 2 and the second front electrodes 3 is formed by screen printing the Ag-based paste (Ag—Pd 20%) on the back surface of the large-sized substrate 10A, followed by drying and firing the paste.

Figure 13D:
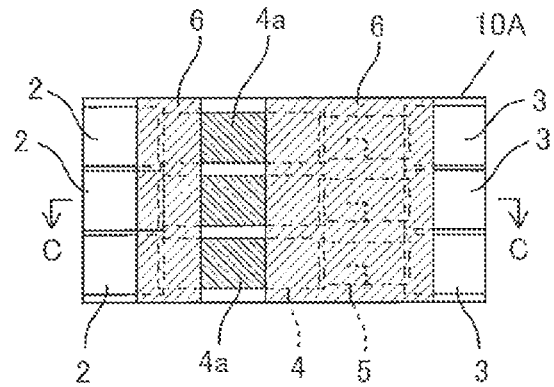
Figure 13B:
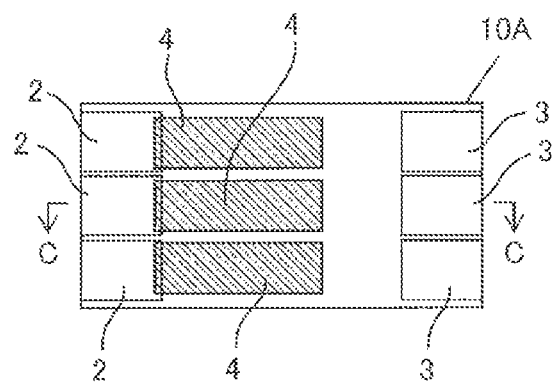
Figure 14D:
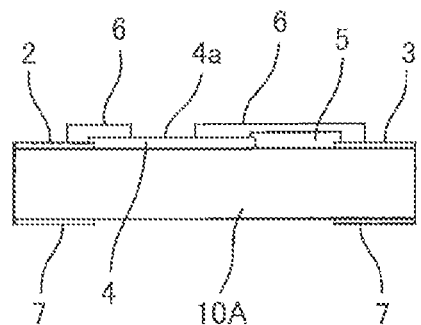
Figure 14B:
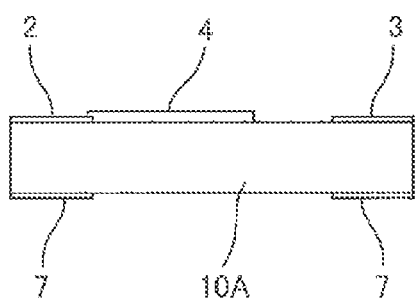

Next, as illustrated in FIG. 13(b) and FIG. 14(b), three sulfurization detecting conductors 4 that are connected to the respective first front electrodes 2 are formed by screen printing an Ag-based paste having principally Ag on the front surface of the large-sized substrate 10A, followed by drying and firing the paste. Here, the content of Pd included in the Ag paste differs among the three sulfurization detecting conductors 4. First, the Ag paste containing no Pd is screen printed and dried. After that, the Ag-based paste with a Pd content of 5% is screen printed and dried. Finally, the Ag-based paste with a Pd content of 10% is screen printed, dried, and fired. In this way, the sulfurization detecting conductors 4 that are connected respectively to the three separated first front electrodes 2 are formed.

Figure 13E:
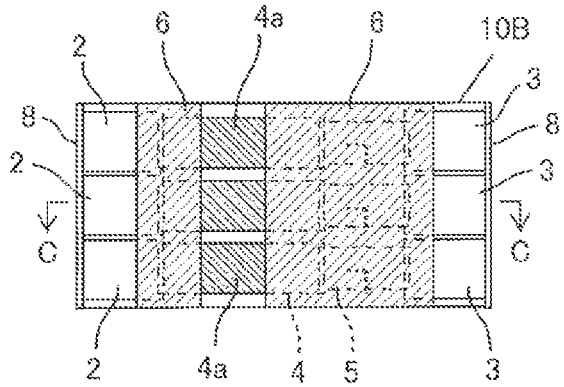
Figure 13C:
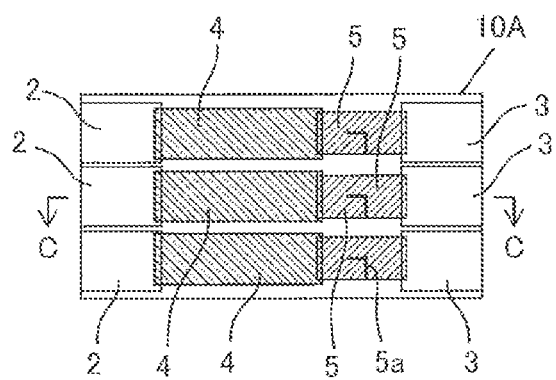
Figure 14E:
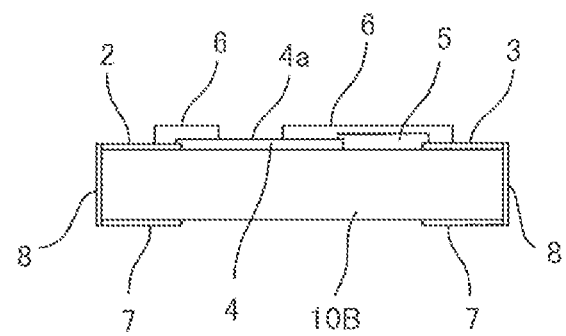
Figure 14C:
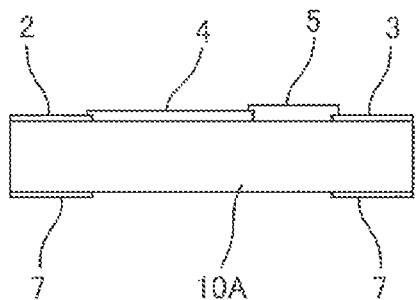

Next, as illustrated in FIG. 13(c) and FIG. 14(c), the series circuit sections in which the sulfurization detecting conductors 4 and the resistive elements 5 are connected in series are formed respectively between three corresponding sets of first front electrodes 2 and second front electrodes 3 by screen printing a resistive paste such as a ruthenium oxide paste and drying and firing the paste. Since these resistive elements 5 are formed together using the same material, the resistance values of the resistive elements 5 connected to the sulfurization detecting conductors 4 are equal.

Next, in a region covering all the resistive elements 5, an undercoat layer, which is not illustrated, is formed by screen printing a glass plate and drying and firing the glass paste. After that, trimming grooves 5a are formed through the undercoat layer into the resistive elements 5 and their resistance values are adjusted. For this adjustment, trimming adjustment of each resistive element 5 can be performed individually while bringing probes into contact with a pair of a first front electrode 2 and a second front electrode 3 which are connected across a sulfurization detecting conductor 4 and the resistive element 5 at either end, without damaging the sulfurization detecting conductors 4 by the probes.

After that, the two-layered protective film 6 partially covering the sulfurization detecting conductors 4 and entirely covering the resistive elements 5 and the conductors 11 for measurement is formed by screen printing an epoxy-based resin paste over the undercoat layer and thermally curing the paste, as illustrated in FIG. 13(d) and FIG. 14(d). At that time, the sulfurization detecting portions 4a are defined to be exposed out of the protective film 6 in the middle portions of all the sulfurization detecting conductors 4; these sulfurization detecting portions 4a have identical surface areas that are exposed out of the protective film 6. Also, connections that connect the first front electrodes 2 with the sulfurization detecting conductors 4 are covered by the protective film 6 and connections that connect the second front electrodes 3 with the conductors 11 for measurement are also covered by the protective film 6.

Next, all the sulfurization detecting portions 4a are covered by masking made of a soluble material or the like, which is not illustrated. In this state, the large-sized substrate 10A is primarily separated into strip-like substrates 10B along primary separation trenches. After that, by sputtering a Ni/Cr layer onto the cut surfaces of the strip-like substrates 10B, the end face electrodes 8 are formed, one of which connects the first front electrodes 2 and their back electrode 7 and the other of which connects the second front electrodes 3 and their back electrode 7, as illustrated in FIG. 13(e) and FIG. 14(e). By forming these end face electrodes 8, the three separated first front electrodes 2 are put in conduction and the three separated second front electrodes 3 are also put in conduction.

Figure 13F:
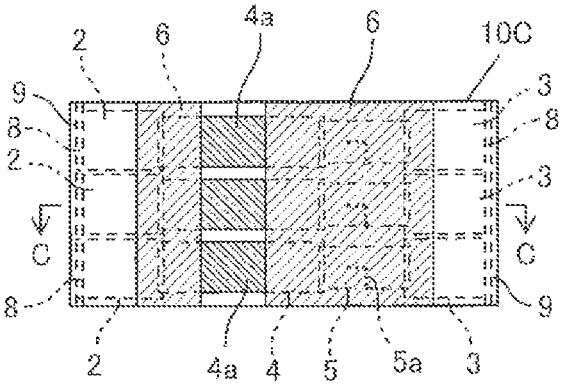
Figure 14F:
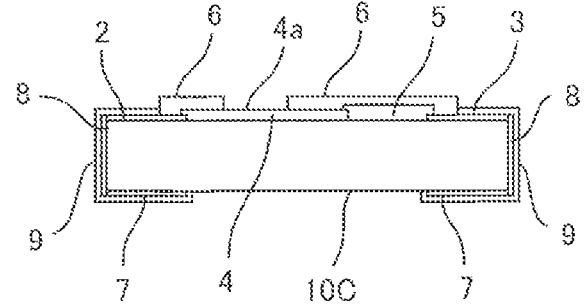

Next, the strip-like substrates 10B are secondarily separated into multiple chip-sized substrates 10C along secondary separation trenches and Ni—Sn plating layers are formed by applying electroplating to these chip-sized substrates 10C, followed by removal of the abovementioned masking using a solvent. Thereby, the external electrodes 9 are formed over the surfaces of the first front electrodes 2, the second front electrodes 3, the back electrodes 7, and the end face electrodes 8, as illustrated in FIG. 13(f) and FIG. 14(f), and the sulfurization detection resistor 60 which is depicted in FIG. 12 is completed.

In the thus structured sulfurization detection resistor 60 pertaining to the sixth embodiment example, the resistance value adjustment (trimming) of each resistive element 5 can be performed with high accuracy by bringing probes into contact with opposing ones of the first front electrodes 2 being separated and the second front electrodes 3 being separated. After the trimming, the first front electrodes 2 being separated and the second front electrodes 3 being separated are put in conduction, respectively, by the end face electrodes 8; this can make the resistor as effective as the sulfurization detection resistor 10 pertaining to the first embodiment example.

Figure 15:
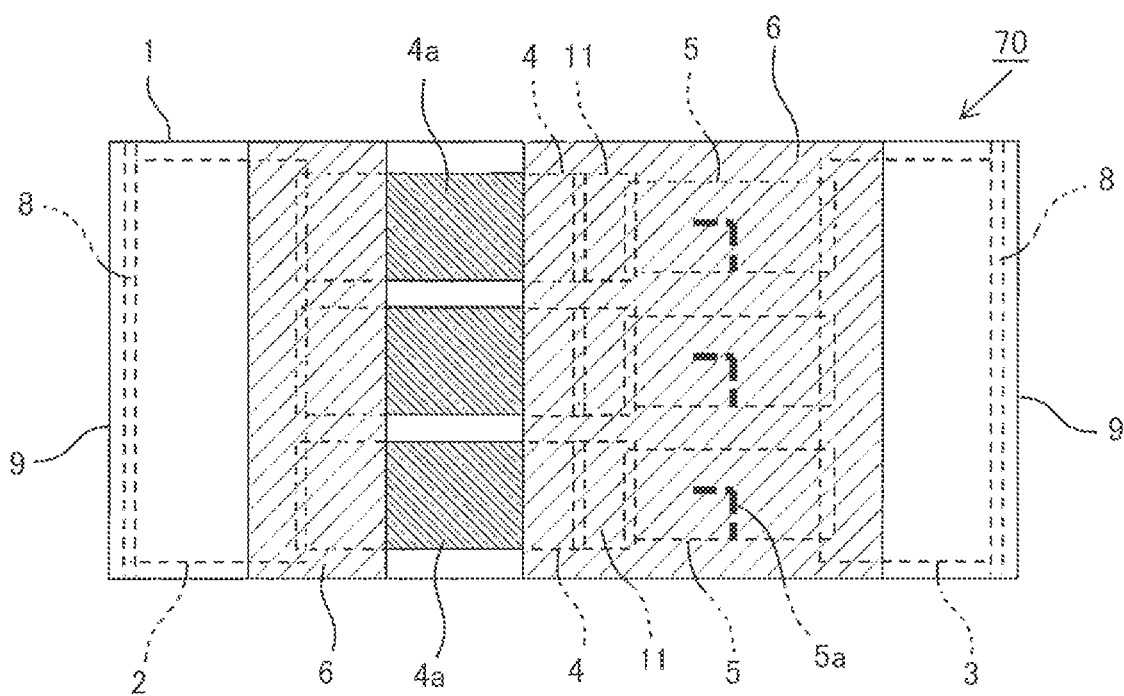
FIG. 15 is a plan view of a sulfurization detection resistor pertaining to a seventh embodiment example of the present invention.

FIG. 15 is a plan view of a sulfurization detection resistor 70 pertaining to a seventh embodiment example of the present invention, and its components corresponding to those in FIG. 8 are assigned identical reference numerals and their duplicated description is omitted.

For the sulfurization detection resistor 70 pertaining to the seventh embodiment example, as depicted in FIG. 15, three resistive element 5 are connected in parallel to the second front electrode 3 so as to correspond to three sulfurization detecting conductors 4 connected in parallel to the first front electrode 2. Between the corresponding ones of the sulfurization detecting conductors 4 and the resistive elements 5, conductors 11 for measurement having the same conductive material are connected in series, respectively. Trimming grooves 5a for resistance value adjustment are formed in all the resistive elements 5. The resistor structure other than above is basically the same as the sulfurization detection resistor 10 pertaining to the first embodiment example.

In the thus structured sulfurization detection resistor 70 pertaining to the seventh embodiment example, the timing for each sulfurization detecting conductor 4 to become disconnected depending on the cumulative amount of sulfurization is differentiated by forming the sulfurization detecting conductors 4 that are made of different material compositions and/or have different film thicknesses. However, the conductors 11 for measurement made of the same conductive material are inserted for connecting the sulfurization detecting conductors 4 with the resistive elements 5. Thereby, measurement terminals for trimming are made to have the same contact resistance and resistance value adjustment can be performed at high accuracy. In addition, since there is an even amount of Ag diffusion into all the resistive elements 5, Ag diffusion can have an even effect on the temperature characteristic of the resistive elements 5.

Additionally, in a combination of the seventh embodiment example and the foregoing fourth embodiment example (see FIG. 8), the conductors 11 for measurement may be connected to one ends of the resistive elements 5 toward the sulfurization detecting conductors 4 and to other ends of the resistive elements 5 toward the second front electrode 3, so that it is possible to form the trimming grooves 5a for resistance value adjustment easily and at high accuracy.

REFERENCE SIGNS LIST 10, 20, 30, 40, 50, 60, 70: sulfurization detection resistor
1: insulted substrate
2: first front electrode
3: second front electrode
4: sulfurization detecting conductor
4a: sulfurization detecting portion
5: resistive element
6: protective film
6a: strip portion
7: back electrode
8: end face electrode
9: external electrode
11: conductor for measurement
11a: sulfurization detecting portion

The invention claimed is:

1. A sulfurization detection resistor comprising an insulated substrate having a rectangular parallelepiped shape, a pair of front electrodes formed at both ends on a main surface of the insulated substrate, resistive elements and sulfurization detecting conductors, each resistive element and each sulfurization detecting conductor being formed in series between the pair of front electrodes, and a protective film formed to entirely cover the resistive elements and partially cover the sulfurization detecting conductors,
wherein the multiple sulfurization detecting conductors are connected in parallel to the front electrodes and have their sulfurization detecting portions that are exposed out of the protective film;
the multiple sulfurization detecting conductors respectively have material compositions having principally Ag but with different contents of Pd; and
different timings are set for the multiple sulfurization detecting portions respectively to become disconnected depending on a cumulative amount of sulfurization.

2. The sulfurization detection resistor according to claim 1,
wherein the multiple sulfurization detecting portions have identical surface areas that are exposed out of the protective film.

3. The sulfurization detection resistor according to claim 2,
wherein the multiple sulfurization detecting conductors have respectively different film thicknesses.

4. The sulfurization detection resistor according to claim 1,
wherein the multiple sulfurization detecting conductors have respectively different film thicknesses.

5. The sulfurization detection resistor according to claim 1,
wherein the protective film is formed to cover connections that connect the multiple sulfurization detecting conductors with the front electrodes.

6. The sulfurization detection resistor according to claim 1,
wherein the protective film is formed between the multiple sulfurization detecting portions arranged in parallel.

7. The sulfurization detection resistor according to claim 1,
wherein a conduction ensuring circuit section is formed in parallel with the sulfurization detecting conductors between the pair of front electrodes, the conduction ensuring circuit section includes a resistive element and a conductor connected in series, and both the resistive element and the conductor are covered by the protective film.

8. The sulfurization detection resistor according to claim 1, wherein in regard to the resistive elements and the sulfurization detecting conductors, each resistive element and each sulfurization detecting conductor being formed in series between the pair of front electrodes, a trimming groove is formed in the each resistive element, and the each sulfurization detecting conductor and a conductor for measurement are connected across the each resistive element at either end thereof.

9. The sulfurization detection resistor according to claim 8, wherein the conductor for measurement is a sulfurization detecting conductor, and sulfurization detecting portions having identical surface areas are defined respectively in a pair of conductors for measurement connected across the each resistive element at either end thereof.

10. A sulfurization detection resistor manufacturing method comprising:

a front electrode forming step of forming multiple pairs of opposing front electrodes in a separated state at both ends on a main surface of an insulated substrate;

a series circuit section forming step of forming resistive elements and sulfurization detecting conductors such that each resistive element and each sulfurization detecting conductor are connected in series between the multiple pairs of the front electrodes, respectively;

a resistance value trimming step of bringing probes into contact with the multiple pairs of the front electrodes and adjusting a resistance value of each individual one of the multiple resistive elements; and after the resistance value trimming step, a protective film forming step of forming a protective film to entirely cover the resistive elements and partially cover the sulfurization detecting conductors, wherein the resistive elements and the sulfurization detecting conductors are comprised in the multiple series circuit sections, wherein, in the protective film forming step, sulfurization detecting portions are defined to be exposed out of the protective film respectively in the sulfurization detecting conductors comprised in the multiple series circuit sections, and different timings are set for the multiple sulfurization detecting portions respectively to become disconnected depending on a cumulative amount of sulfurization.

\* \* \* \* \*